Jan. 19, 1960    O. M. SEALANDER    2,921,379
WHEEL ALIGNING DEVICE
Filed July 26, 1955    2 Sheets-Sheet 1
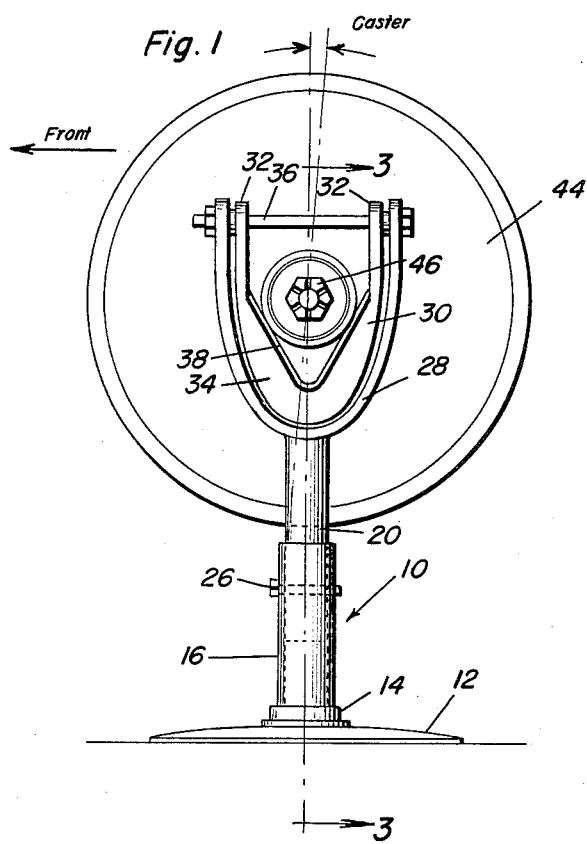
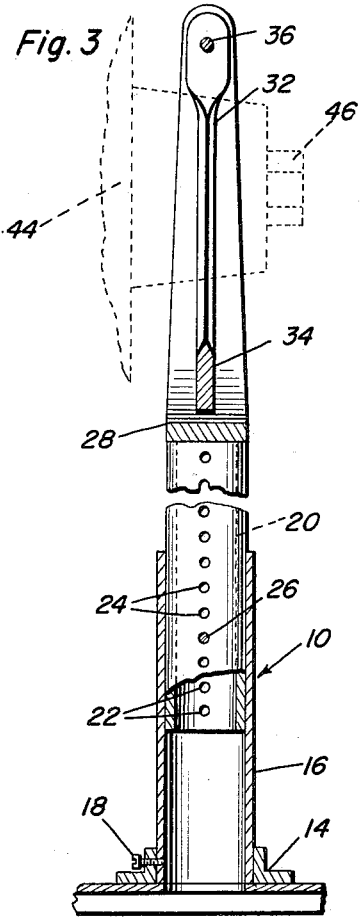
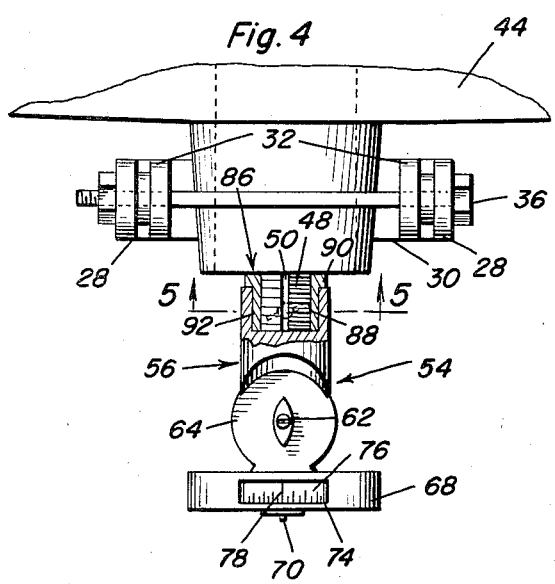
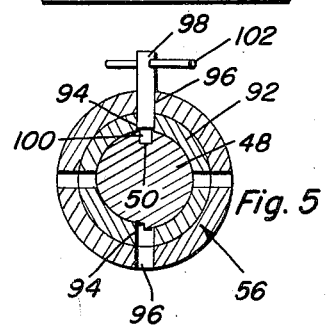
Oscar M. Sealander
INVENTOR.

Jan. 19, 1960   O. M. SEALANDER   2,921,379
WHEEL ALIGNING DEVICE
Filed July 26, 1955   2 Sheets-Sheet 2

Oscar M. Sealander
INVENTOR.

United States Patent Office 2,921,379
Patented Jan. 19, 1960

2,921,379

WHEEL ALIGNING DEVICE

Oscar M. Sealander, Gothenburg, Nebr.

Application July 26, 1955, Serial No. 524,525

3 Claims. (Cl. 33—203.12)

This invention relates in general to new and useful improvements in automotive repair equipment, and more specifically to an improved wheel aligning device.

In order that the front wheels of an automobile may be properly aligned, it is necessary that the wheels not only be properly toed in or toed out, which may be accomplished by means of a relatively simple tool, but also must be adjusted so as to have the proper caster and camber. The caster of a vehicle wheel is the angle in a longitudinal vertical plane between the vertical and the kingpin center line. The camber of a wheel is the angle in a transverse vertical plane between the vertical and a longitudinal plane passed through the wheel. In order to measure the caster and camber of a vehicle wheel, there has been heretofore provided complicated machines which are relatively expensive and also require a relatively great amount of space in a garage.

It is therefore the primary object of this invention to provide an improved wheel aligning device for determining the caster and camber of a vehicle wheel and for setting the same, the wheel aligning device being of an extremely simple nature and being relatively inexpensive to manufacture.

Another object of this invention is to provide an improved wheel aligning device which is portable and may be conveniently carried in a small box and placed upon a vehicle as necessary in order to align the wheels thereof.

Still another object of this invention is to provide an improved wheel aligning assembly which includes a stand for supporting a front wheel hub at a desired height with the front wheel removed so that the spindle of the front wheel hub may be readily adjusted in order to set the caster and camber thereof, and a wheel aligning device which may be placed upon the spindle for determining the caster and camber thereof.

A further object of this invention is to provide an improved wheel aligning device which may be readily mounted upon a front wheel spindle and which includes a gauge selectively disposable either in a longitudinal vertical plane or a transverse vertical plane with respect to a vehicle so as to selectively determine the caster and camber of a vehicle wheel.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is an elevational view of a wheel stand utilized for the purpose of supporting a vehicle hub when the wheel thereof is removed, the front hub being shown in elevation with the remainder of the vehicle omitted for purposes of clarity;

Figure 3 is an enlarged vertical sectional view taken substantially upon the plane indicated by the section line 3—3 of Figure 1 and shows the details of the stand, an intermediate portion of the stand being broken away and the front hub being shown in dotted lines;

Figure 2:
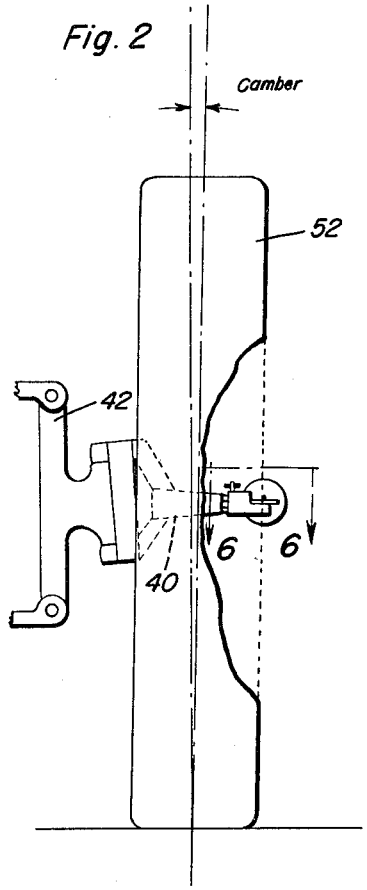
Figure 2 is an elevational view of a vehicle front wheel and shows the relationship thereof with respect to the front spindle, which is shown diagrammatically, the front spindle being provided with the wheel aligning device, which is the subject of this invention, for determining the camber of the wheel.
Figure 6:
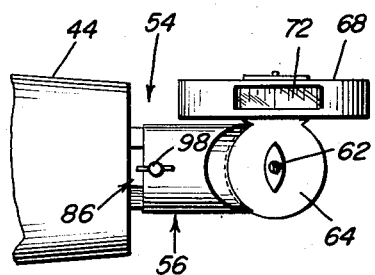
Figure 7:
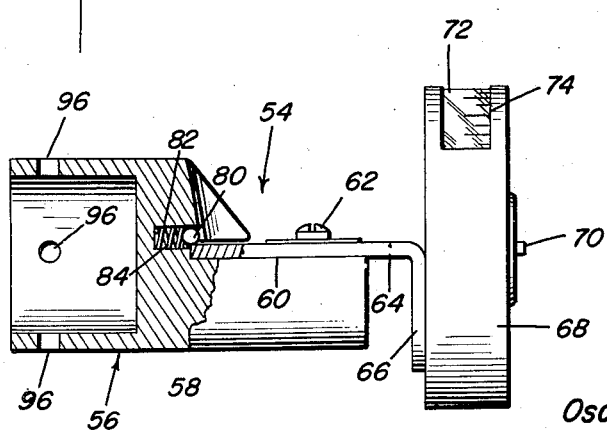

Figure 4 is a fragmentary top plan view of a front wheel hub and spindle with the front wheel hub being supported by the wheel stand and there being mounted on the spindle the wheel aligning device, a portion of the wheel aligning device being broken away and shown in section in order to illustrate the relationship thereof with respect to the front wheel spindle, an aligning pin being shown in dotted lines;

Figure 5 is an enlarged fragmentary transverse vertical sectional view taken substantially upon the plane indicated by the section line 5—5 of Figure 4 and shows the manner in which the wheel aligning device is aligned with the front spindle;

Figure 6 is an enlarged top plan view of the wheel aligning device mounted on a vehicle front wheel spindle and shows the gauge in the gauge housing being rotated to a position parallel to the spindle for measuring the camber of the wheel; and Figure 7 is an enlarged elevational view of the wheel aligning device with a portion of the sleeve thereof being broken away and shown in section in order to clearly illustrate the details of a ball detent for retaining the gauge housing at a selected angle with respect to the axis of the sleeve.

Referring now to Figures 1 and 3 in particular, it will be seen that there is illustrated a wheel stand, which is referred to in general by the reference numeral 10. The wheel stand 10 includes a base 12. Secured to the base 12 and projecting upwardly therefrom is a mounting ring 14 in which there is seated the lower end of a lower tubular standard 16, the standard 16 being retained in place by a setscrew 18. Telescoped within the upper end of the lower tubular standard 16 is an upper standard 20. The standards 16 and 20 are provided with vertically spaced, horizontal apertures 22 and 24, respectively, through which a pin 26 may be selectively positioned to retain the standards 16 and 20 in selective telescoped relation. Secured to the upper end of the upper standard 20 is an outer yoke 28.

Supported by the outer yoke 28 is an inner yoke 30. The inner yoke 30 includes a pair of supporting legs 32 which have their lower ends connected together by a bight portion 34. The legs 32 are pivotally connected to the upper part of the outer yoke 28 by means of a generally horizontal shaft 36. The bight portion 34 has a V-shaped interior supporting surface 38.

A front wheel assembly includes a spindle 40 which is mounted for pivotal movement on a kingpin (not shown) carried by a spindle support assembly 42 which is adjustable with respect to the frame (not shown) of the vehicle. Mounted on the spindle 40 for rotation is a front wheel hub 44. The hub 44 is provided with suitable bearings (not shown) and is retained in place by a nut 46 threadedly engaged on an outer externally threaded portion 48 of the spindle 40. The threaded portion 48 is provided with a keyway 50 which extends longitudinally of the spindle 40 and would be vertically disposed if there is no caster in the spindle 40. Removably secured to the hub 44 is a front wheel 52.

In order that the spindle support assembly 42 may be adjusted, it is necessary that the front wheel 52 be first removed. However, in order that the caster and camber of a vehicle wheel may be properly set, it is necessary that the spindle 40 retain its normal supporting function.

Therefore, it is necessary that there be provided suitable means for supporting the hub 44 at its normal height. That is the purpose of the wheel stand 10.

After the front wheel or wheels of a vehicle are properly supported on the wheel stands 10, with the wheel stands being mounted on a level spot, it is necessary that the caster and camber of the front wheels or front spindles 40 be checked and set. In order to accomplish this, there is provided the wheel aligning device, which is referred to in general by the reference numeral 54. The wheel aligning device 54 includes a sleeve 56 which includes a solid outer portion 58. The outer portion 58 is recessed to form a flat, normally horizontal surface 60. Seated on this surface 60 and pivotally carried by a fastener 62 is an L-shaped bracket 64. The bracket 64 includes a vertical flange 66 which is secured to the inner face of a generally cylindrical housing 68. The housing 68 includes a shaft 70 on which a weighted dial 72 is rotatably journaled.

In order that the dial 72 may be conveniently read, there is provided a sight opening 74 in the upper part of the housing 68. The sight opening 74 is preferably closed by a transparent panel 76 having an indicator line 78 thereon. When the flat surface 60 is horizontally disposed, the dial 72, when read utilizing the indicator lines 78, will read zero.

Inasmuch as the wheel aligning device 54 is to be utilized for both determining and setting caster and camber, it is necessary that the housing 68 be positioned both normal to the axis of the sleeve 56, as illustrated in Figure 4, and parallel to the axis of the sleeve 56, as is illustrated in Figure 6. In order to accomplish this, there is mounted in the sleeve 56, as is best illustrated in Figure 7, a spring urged ball detent 80. The ball detent 80 is mounted in a bore 82 formed in the sleeve 56 and is urged outwardly thereof by a spring 84. The ball detent 80 engages the bracket 64 and retains it in an adjusted position. If desired, notches may be formed in the bracket 64 for seating the ball detent 80.

In order that the sleeve 56 may be properly mounted on a spindle 40, there is provided a special spindle nut which is referred to in general by the reference numeral 86. The spindle nut 86 is intended to be utilized as a temporary replacement for the spindle nut 46 and includes an internally threaded bore 88 which is selectively engaged over the threaded portion 48. The inner part of the replacement nut 86 is in the form of a wrench engageable portion 90. The outer part of the replacement nut 86 includes a cylindrical portion 92 of a size to be snugly received within the inner portion of the sleeve 56, as is best illustrated in Figures 4 and 5.

The cylindrical portion 92 and the sleeve 56 are provided with circumferentially spaced, radiating bores 94 and 96, respectively. When the replacement nut 86 is properly threaded upon the spindle 40, one of the bores 94 thereof is aligned with the keyway 50 in the threaded portion 48 of the spindle 40. Then, the sleeve 56 is positioned so that the normally uppermost bore 96 thereof is aligned with the bore 94 which is, in turn, aligned with the keyway 50. Then, an aligning pin 98 is passed through these two bores 94 and 96. The aligning pin 98 is provided with a rectangular lower end 100 of a size to be snugly received within the keyway 50. The upper part of the aligning pin 98 is provided with a cross-bar 102 to facilitate positioning thereof.

In the use of the present invention, a jack is placed under the center of the A-frame of a vehicle. Then, the tires of the front wheels are checked to determine whether they both have the proper tire pressure. Next, the height to the center of the spindles is measured, after which the jack is applied against the A-frame so as to lift both of the front tires clear of the ground. Then, the front wheels 52 are removed and the wheel stands 10 are positioned with respect to the hubs 44. This having been accomplished, the spindle nuts 46 are removed and the proper replacement nuts 86 positioned on the threaded portions 48 of the spindles 40. This having been accomplished, the sleeves 56 are positioned with respect to the spindles 40 by means of the aligning pins 98 in the manner described above.

After the wheel aligning devices 54 have been properly positioned on the spindles 40, the housings 64 are disposed longitudinally of the vehicle, as is illustrated in Figure 4. A reading is then taken on the dial 72 in order to determine the caster of the particular front wheel. If the caster is incorrect, it is then set by adjusting the front spindle support 42. Then, the housing 68 is rotated 90° to the position of Figure 6. By reading the dial 72 with the housing 68 in this position, the camber of the particular front wheel may be determined and set.

After the caster and camber of the front wheels have been set, the wheel aligning device 54 is removed, and the replacement nuts 86 are replaced by the original nuts 46. Then, the jack is reapplied to the A-frame, and the front hubs 44 lifted so that the stands 10 may be removed. After this, the front wheels 52 are replaced and the vehicle has now had the front end thereof aligned, it being understood that the toe-in has been properly adjusted by another device which is not the subject of this invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vehicle front wheel aligning device for a front wheel of the type including a spindle having a keyway lying in a transverse plane passing through the center line of a supporting kingpin, said wheel aligning device comprising a spindle nut, said spindle nut being a special nut and being internally threaded for threaded engagement on a front wheel spindle and having a cylindrical outer portion, a sleeve engaged over said nut on said cylindrical outer portion, said sleeve having a flat gauge mounting surface lying in a plane extending longitudinally of said sleeve, said nut and said sleeve having aligned transverse openings, a retaining member extending through said sleeve and said nut and into said keyway to position said flat gauge mounting surface normal to the transverse plane passing through the center line of the supporting kingpin and retaining said sleeve against shifting relative to said nut, and gauge means pivotally mounted on said gauge mounting surface for selectively indicating caster and camber.

2. A vehicle front wheel aligning device for a front wheel of the type including a spindle having a keyway lying in a transverse plane passing through the center line of a supporting kingpin, said wheel aligning device comprising a spindle nut, said spindle nut being a special nut and being internally threaded for threaded engagement on a front wheel spindle and having a cylindrical outer portion, a sleeve engaged over said nut on said cylindrical outer portion, said sleeve having a flat gauge mounting surface lying in a plane extending longitudinally of said sleeve, said nut and said sleeve having aligned transverse openings, a retaining member extending through said sleeve and said nut and into said keyway to position said flat gauge mounting surface normal to the transverse plane passing through the center line of the supporting kingpin and retaining said sleeve against shifting relative to said nut, a mounting plate, said mounting plate including a horizontal flange and a vertical flange, said horizontal flange overlying and being seated on said flat gauge mounting surface, a pivot member extending normal to said flat gauge mounting surface and through said horizontal flange for pivotally mounting said mounting plate, a vertically disposed gauge carried by said vertical flange, cooperating means on said sleeve and said mounting plate selectively retaining said gauge in a vertical plane normal to the axis of said sleeve and a vertical plane parallel to the axis of said sleeve.

3. A front wheel aligning assembly for aligning a wheel without removing the wheel drum, said front wheel aligning assembly comprising a wheel aligning device and wheel supporting means for engaging a front wheel hub and supporting the front wheel therethrough, said wheel aligning device including a sleeve engageable over a front spindle nut, aligning means for aligning said sleeve with a front spindle, and gauge means carried by said sleeve for selectively indicating caster and camber, said wheel supporting means being in the form of a wheel stand including a vertical stand, a yoke carried by said vertical stand for receiving a front wheel hub, said yoke having an upwardly opening V-shaped hub-engaging surface, a transverse pivot pin carried by said vertical stand, said yoke being pivotally mounted on said transverse pivot pin for swinging movement so as to be self aligning.

References Cited in the file of this patent
UNITED STATES PATENTS

| | | |
|---|---|---|
| 2,032,399 | Button | Mar. 3, 1936 |
| 2,050,721 | McCullough | Aug. 11, 1936 |
| 2,074,108 | Graham | Mar. 16, 1937 |
| 2,077,082 | Wedlake | Apr. 13, 1937 |
| 2,439,854 | Lipski | Apr. 20, 1948 |
| 2,505,884 | Cockerell | May 2, 1950 |
| 2,608,000 | Castiglia | Aug. 26, 1952 |
| 2,671,625 | Buckley | Mar. 9, 1954 |